March 14, 1939.  J. MIHALYI  2,150,693
CAMERA WINDING DEVICE
Filed April 17, 1937  2 Sheets-Sheet 1
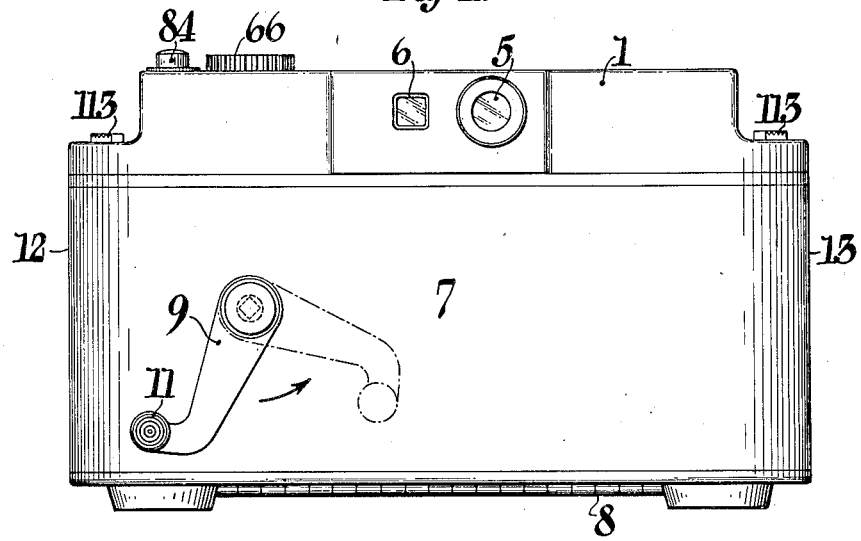
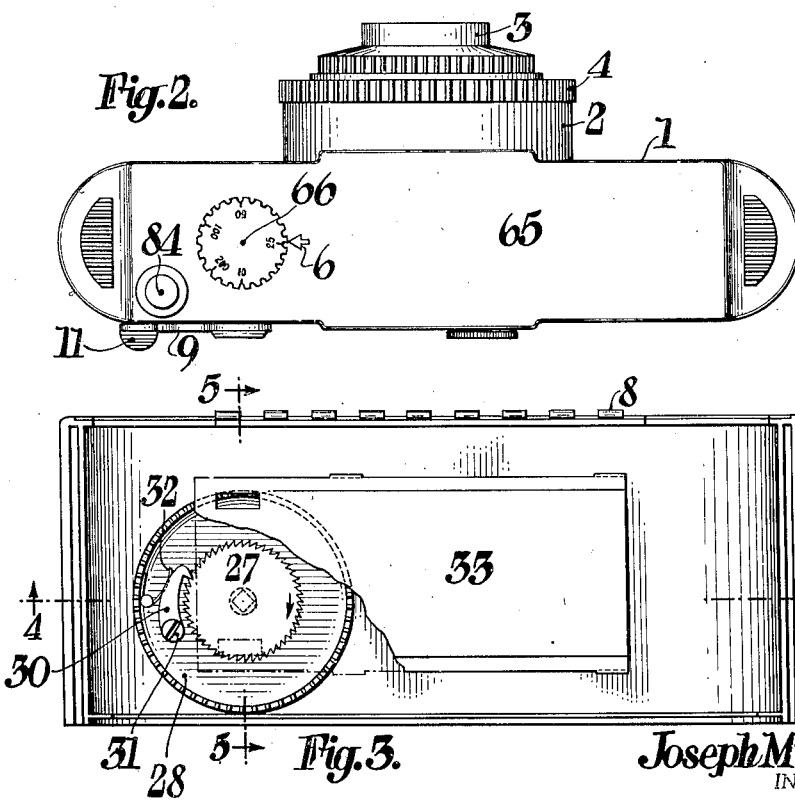
Joseph Mihalyi,
INVENTOR
BY
ATTORNEYS.

March 14, 1939.  J. MIHALYI  2,150,693
CAMERA WINDING DEVICE
Filed April 17, 1937  2 Sheets-Sheet 2
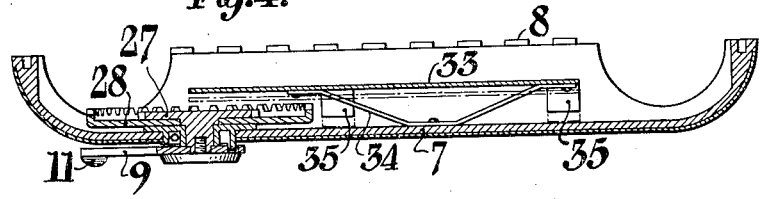
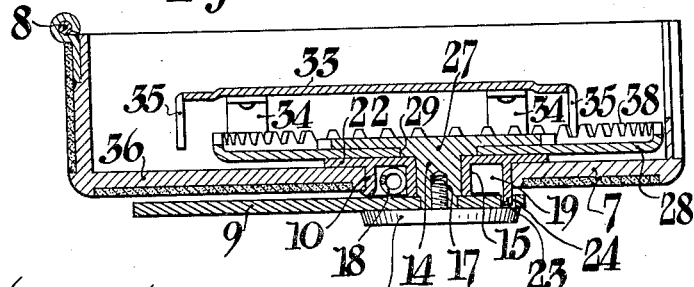
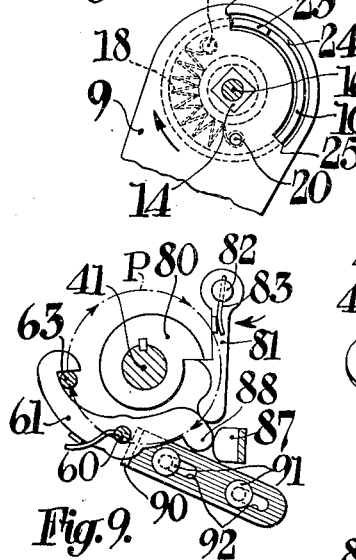
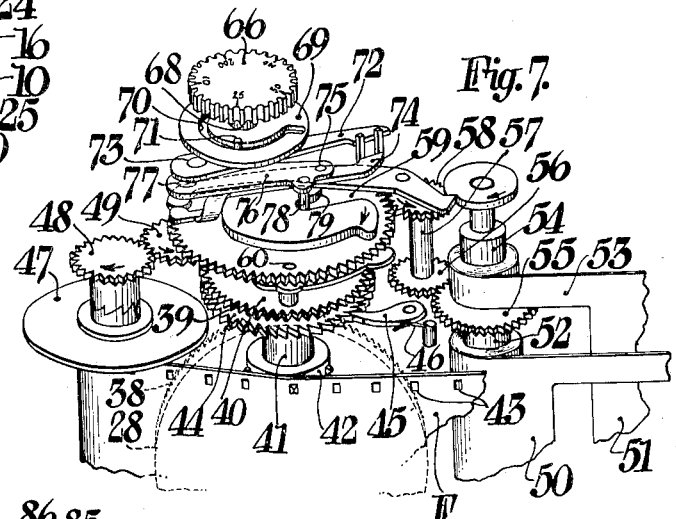
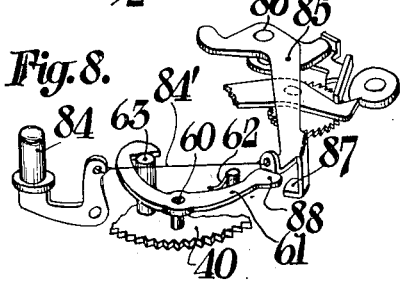
Joseph Mihalyi,
INVENTOR.
BY
ATTORNEYS.

Patented Mar. 14, 1939

2,150,693

UNITED STATES PATENT OFFICE 2,150,693

CAMERA WINDING DEVICE

Joseph Mihalyi, Rochester, N. Y., assignor to Eastman Kodak Company, Rochester, N. Y., a corporation of New Jersey Application April 17, 1937, Serial No. 137,483

11 Claims. (Cl. 95—31)

This invention relates to photography, and more particuuarly to photographic cameras.

One object of my invention is to provide a camera of the roll film type with a single oscillatable lever means for winding the film. Another object of my invention is to provide a winding lever on the back of a camera with a handle which is readily accessible to an operator while the camera is being held at eye level for taking pictures for winding parts of the camera in preparation for taking exposures. Another object of my invention is to provide a winding mechanism for cameras of the ratchet type and to provide a means for limiting the stroke of the winding handle and for returning the winding handle to its initial position of rest. Another object of my invention is to provide a removable camera back with a winding mechanism and to provide the camera body with winding mechanism, the two mechanisms being automatically coupled together by closing the camera back. Another object of my invention is to provide a winding mechanism in which the winding operation is completed by moving the winding handle until it comes to a definite stop. Still another object of my invention is to provide a single handle arranged in position to be readily operated by the thumb of a hand holding one end of the camera while the camera is in a picture-taking position. A still further object of my invention is to provide a winding lever which may be used to simultaneously wind the film and set the shutter of a camera, and other objects will appear from the following specification, the novel features being particularly pointed out in the claims at the end thereof.

In cameras, and particularly in cameras of the so-called miniature type adapted to take pictures on film of approximately motion picture size, it is frequently desirable to take a series of pictures rapidly of action taking place, and in order to provide for a satisfactory means for conditioning the camera for exposure, it is desirable to have a camera in which the winding operation necessary for conditioning the camera for exposure is in a position which is readily accesible to an operator while the camera is being held at eye level. It is thus possible to take a series of pictures without removing the camera from its picture-taking position, so that the object being photographed may be continuously watched through the camera finder. In cameras of this type, focal plane shutters may be used, and it is customary to use roll film. Accordingly, in a preferred embodiment of my invention, as will be hereinafter shown and described, a film handle is provided for winding the film and setting the shutter, this handle being so arranged that it may be readily operated by the thumb of a hand holding the camera at eye level.

Coming now to the drawings, wherein like reference characters denote like parts throughout:

Fig. 1 is a rear elevation of a camera embodying a preferred form of my improved winding mechanism.

Fig. 2 is a top plan view of the camera shown in Fig. 1.

Fig. 3 is a plan view of the camera back removed from the camera shown in the preceding figures.

Fig. 4 is a section through the camera back on line 4—4 of Fig. 3.

Fig. 5 is a greatly enlarged section taken on the line 5—5 of Fig. 3.

Fig. 6 is an enlarged detail in elevation, showing a portion of the winding handle and winding handle control.

Fig. 7 is a schematic view in perspective, showing portions of the film winding and shutter setting mechanism.

Fig. 8 is a schematic fragmentary perspective view, showing portions of the shutter releasing mechanism.

Fig. 9 is a fragmentary detail view of a portion of the shutter controlling mechanism.

In the preferred embodiment of my invention shown in the drawings, the camera may comprise of a camera body 1, from which a tubular member 2 extends outwardly to support an objective, the front element of which may be mounted in the lens cell 3. A suitable knurled ring 4 may be used for focusing the objective, and this is preferably done with any of the known types of mechanically operated range finders.

The range finder is not a part of the present invention, but the rear sight for the range finder is indicated at 5 as being adjacent the rear sight 6 of a view finder. This camera is of the type generally held at eye level, and the winding mechanism has been particularly designed for rapid operation while the camera is held so that an operator may move the winding handle while viewing the object being photographed either through the view finder opening 6 or the range finder opening 5.

The camera is provided with a movable camera back 7, which is here shown as being hinged at 8 to the camera body 1. On this camera back, I provide a winding handle 9 adapted to turn in a suitable bearing 10, best shown in Fig. 5, carried by the camera back 7. The handle 9 terminates in a finger grip 11, which is preferably knurled so that it may be readily operated by a thumb or finger of a hand holding the end 12 of the camera, since cameras of this type are usually held by the two hands of the operator grasping the ends 12 and 13 of the camera.

As indicated in Figs. 4 and 5, the handle 9 is attached to a shaft 14 passing through a central portion 15 of the bearing member and being attached to the shaft 14 by means of the nut 16 which is threaded at 17 thereto.

In order to hold the handle in its normal position of rest shown in Fig. 1, I provide a spring 18 which lies in the annular recess 19 in the bearing member 10. This spring may be attached at one end to a pin 20 carried by the handle 9 and may be attached at the other end to a pin 21 carried by the base or flange 22 of the bearing member 10. The spring tends to move the handle in the direction shown by the arrow in Fig. 1, in which position the handle may be held by the lug 23 which extends up through a slot 24 in the handle. As the handle is moved in a counterclockwise direction with regard to Fig. 1, it may move from the full to the dot-and-dash line position in Fig. 1, at which time the opposite end 25 of the slot will strike the upstanding lug 23 and thus limit the total movement of the handle. This operation, of course, places the spring 18 under tension, and as soon as the handle is released, it will move smoothly back to its position of rest, in which the lug 23 engages the end 26 of the slot 24. It is understood that the head 16 of the screw, as shown in Fig. 5, covers the slot 24 and the lug 23, so that dust and dirt is prevented from entering.

The shaft 14 is integral with or is attached to a ratchet wheel 27 so that each time the handle is moved back and forth, the ratchet wheel is moved back and forth. Mounted coaxially with the ratchet wheel 27 is a dished gear 28, this dished gear being free to turn upon a shoulder 29 of the ratchet wheel which forms a shaft on which the dished gear may turn.

This dished gear 28 carries a pawl 30 mounted on a pivot 31 and pressed by a spring 32 into contact with the ratchet wheel 27. Movement of the ratchet wheel in the direction shown by the arrow in Fig. 3 will cause the dished gear 28 to move through the engagement of the pawl with the ratchet wheel 27. This movement occurs only when the handle is being moved in the direction shown by the arrow in Fig. 1, in which the handle 9 is manually operated. When the handle comes to a stop and is returned to its initial position by means of the spring 18, the light spring 32 permits the pawl to ride idly while the ratchet wheel turns in a reverse direction, so that the dished gear 28 is only moved in one direction.

The dished gear, pawl and ratchet wheel are all mounted on the wall of the camera back 7, and they are mounted beneath a film pressure plate 33. This pressure plate is supported by the spring arms 34 which tend to move the pressure plate away from the back to hold the film against the usual exposure frame. In order to prevent the pressure plate from being moved too far, and into engagement with the pawl and ratchet and dished gear mechanism, there are preferably four downwardly extending arms 35, as best shown in Figs. 4 and 5, which are adapted to contact with the inside wall 36 of the camera back so that the maximum displacement of the film pressure pad 33 is shown in the broken line position in Fig. 4. In this position, it will be noted that the pressure pad is still spaced from the winding mechanism so that regardless of its position, it cannot affect the operation of this part of the winding mechanism.

The teeth 38 of the dished gear are preferably of a pointed variety, so that when the camera back is moved, as by swinging it about the hinge 8, to close the film chamber of the camera after loading film therein, the teeth 38 will be automatically meshed with the teeth 39 of a gear 40 which is fixedly mounted on the shaft 41, carrying a film sprocket 42 which may measure off a section of the film F through engagement with the sprocket apertures 43 therein. I prefer to form the sprocket 42 of such a size that a single revolution will measure off one exposure of film. It is therefore necessary to turn the gear 40 one revolution for winding the proper amount of film into place.

Also affixed to shaft 41 is a ratchet wheel 44 which is permitted to turn in one direction only by a pawl 45 pressed by a spring 46 into engagement with the ratchet. Thus, the sprocket 42 is only permitted to turn in one direction through this pawl and ratchet, and this direction, in the present instance, is in the direction shown by the arrow, toward the film winding spool 47. This spool is driven by a suitable friction clutch, which may be of any desired type and which is not shown in the drawings, through the gears 48 and 49, the latter gear meshing with gear 40. Thus, when the dished gear 28 is turned by the handle 9, gears 48 and 49, through the friction clutch, also drive the take-up reel 47 to wind film thereon. The clutch between the gear 48 and the spool 47 normally slips slightly at each actuation because it is necessary to tend to drive the take-up spool slightly more than the distance the spool will turn because of the varying diameter of the spool due to the building up of convolutions of film thereon.

The turning movement of the gear 40 also winds up the focal plane shutter, a portion of which is shown in Fig. 7. This shutter may consist of the usual two curtains 50 and 51, curtain 50 being wound upon a drum 52, and the tapes 53 of curtain 51 being wound on the spools 54. It is understood that the opposite ends of these curtains are each separately attached to the usual type of spring rollers. The curtains may be driven in one direction by a gear 55 meshing with gear 56, carried by a shaft 57 meshing with a second gear 58, which, in turn, meshes with a large gear 59. This gear carries a pivot 60 on which a tripping latch 61, best shown in Fig. 8, is attached, this latch being normally pressed by a spring 62, also carried by the gear 60, into a position to engage a pin 63 which is carried by the gear 40. When the parts are in engagement, as shown in Fig. 8, movement of the gear 40 in a clockwise direction will also carry gear 59 in the same direction. Due to the latch member 61, it will turn the gear 59 until one revolution is complete, this revolution being adapted, through the gears 55, 56 and 58, to wind up the focal plane shutter.

The focal plane shutter is of the type shown in my copending application Serial No. 174,443, filed November 13, 1937, and while the construction of this shutter is not important to the present application, the releasing mechanism will be briefly described.

On the top wall 65 of the camera, I provide a speed setting disk 66 which may be graduated into suitable units of speed and which may be moved to an indicator 67 to set the shutter for the desired speed. This dial 66 is shown in Fig. 7 and is attached to a shaft 68 which also carries a disk 69 on which a cam slot 70 is cut. A pin 71 extends up in this cam slot, and since this pin is attached to a lever 72, pivoted at 73 to a support, not shown, it regulates the position of the lever 72. This lever forms a stop for a second lever 74, pivoted at 75 to a lever 76 which, in turn, is pivoted at 77 to a support, and which carries a downwardly extending pin 78 which is adapted to engage and ride on the cam surface 79 as the gear 60, to which the cam is permanently attached, is moved.

As indicated in Fig. 9, the shaft 41 carries a cam 80, the object of which is to control the rotation of the shaft 41. This cam may be engaged by a latch member 81 which may turn freely on a shaft 82 and which is pressed by a spring 83 toward the cam. When the shutter is in position for exposure, the parts are adapted to lie in the position shown in Fig. 9. In order to make an exposure, the trigger 84 is depressed, this trigger being connected by a wire 84' to the lever 85, which is pivoted at 86 and which carries a downwardly and inwardly formed operating arm 87.

By depressing the trigger, the part 87 comes in contact with the tail 88 of the latch member 61, thus moving the latch away from the pin 63 and disconnecting the gears 40 and 60. As soon as the gear 60 is disconnected, it turns under the impulse of the shutter curtain springs, which have been previously placed under tension, and the movement of this gear 60 is limited to one revolution or approximately 360°.

This is accomplished by means of a slidable stop 90 which consists of a plate having slots 92 passing around the studs 91. As indicated in Fig. 9, the shaft 60, which carries the latch 61, extends down beyond this latch element and into the path of the upstanding stop 90. With the parts in the position shown in Fig. 9, when the shutter is operated, the pin 60 will travel around through the path shown in broken lines at P, being stopped by striking the opposite side of the upstanding stop 90. This movement is only accomplished after the latch member 81 is released, this releasing operation taking place simultaneously with the release of the lever 60.

Thus, as the tripping member 87 moves against the tail 88 of the latch 61, it likewise cams latch 81 away from the cam 80 on the shaft 41, which permits this shaft to turn as above described.

When the shutter has been operated and the pin lies on the right-hand side of the stop 90, with reference to Fig. 9, by turning the handle member 9 to wind the film and set the shutter, the pin will reverse its path, passing in a counter-clockwise direction around the path indicated by dotted lines at P, until it strikes the left-hand edge of the stop 90. In this position the cam 80 will again be engaged by the latch member 81 and the shutter parts will be held in position for another exposure.

I will not herein describe fully the arrangement by which the shutter curtains 50 and 51 are separately moved to vary the slot between the two curtains for varying the duration of the exposures which can be made with this shutter, because it is not necessary for a complete understanding of the present invention and because it forms the subject matter of my copending application, Serial No. 174,443, filed November 13, 1937, for Focal plane shutter.

As described in the above specification, the operation of taking pictures can be very rapidly carried out with the preferred form of mechanism which I have described herein. Assuming an operator has just completed making an exposure and wishes to make another one, the operating handle 11 may be rapidly pushed one or more times to the right, as viewed in Fig. 1, to wind the film. The operator needs to pay no attention whatsoever to the extent of the stroke of this winding lever, because when the pawl and ratchet mechanism 27 and 31 have been wound a sufficient amount to rotate the gear 40 one revolution, the stop, illustrated in Fig. 9, will definitely stop further winding movement of the handle. The operator, therefore, without attention to the amount of winding that has been accomplished, automatically positions a fresh area of film in front of the exposure aperture of the camera and automatically winds up the shutter. If the speed dial has been set for the desired exposure, it is then only necessary to press the trigger member 84 to make the exposure. After an exposure has been made, the handle 9 can again be operated as above described.

This structure has a good many advantages over the better known type of film winding devices and shutter setting devices, in that a single lever is all that is utilized to accomplish both purposes and that the amount of winding which takes place with this lever is automatically controlled. Moreover, the winding lever is arranged on the back of the camera near the bottom thereof in a natural position to be operated by the thumb of one hand which is grasping the end 12 of the camera, these cameras usually being held by both hands of an operator grasping the ends 12 and 13. The film winding and shutter setting operations do not, therefore, require an operator to release his hold on the camera, nor for that matter, is it necessary to remove the camera from its picture-taking position, in which the view can be watched through the view finder 6.

Providing a film winding mechanism on the back of the camera does not in any way affect the operation of loading, since the camera back may be released by releasing the two latch members 113, which may be of any standard type, so that the back 7 may swing upon its hinge 8 away from the camera body 1 for loading film. This action automatically disengages the dished gear 28 from the gear 40, but since both of these gears have teeth which can be readily brought into engagement—preferably pointed teeth—when the camera back is swung into a closed position, these gears will be immediately and automatically remeshed.

This application illustrates and describes a preferred form of my invention. It is, however, to be taken as merely illustrative of my invention, as obviously many changes may be made in the construction of the various parts without departing from my invention, and I consider as within the scope of my invention all such forms as may come within the scope of the appended claims.

I claim:

1. In a roll film camera, the combination with a camera body, of a back movably mounted with respect to the camera body, a film spool winding shaft carried by the camera body including a gear mounted on the camera body by which said shaft may be rotated, a gear carried by the camera back adapted to mesh with said gear and drive said film spool winding shaft, a pawl and ratchet adapted to drive the gear on the camera back, and a shaft extending through the camera back for operating the pawl and ratchet.

2. In a roll film camera, the combination with a camera body, of a back movably mounted with respect to the camera body, a film spool winding shaft carried by the camera body including a gear mounted on the camera body by which said shaft may be rotated, a gear carried by the camera back adapted to mesh with said gear and drive said film spool winding shaft, a pawl and ratchet adapted to drive the gear on the camera back, a shaft extending through the camera back for operating the pawl and ratchet, a lever carried by said shaft, and a handle on said lever for moving the lever to wind film in the camera body.

3. In a roll film camera, the combination with a camera body, of a back movably mounted with respect to the camera body, a film spool winding shaft carried by the camera body including a gear mounted on the camera body by which said shaft may be rotated, a gear carried by the camera back adapted to mesh with said gear and drive said film spool winding shaft, a pawl and ratchet adapted to drive the gear on the camera back, a shaft extending through the camera back for operating the pawl and ratchet, a lever carried by said shaft for moving said film spool shaft for winding film, the said movable mount for the camera back being adapted to automatically cause the gear mounted on the camera body and the gear mounted on the camera back to mesh when said camera back is moved to a closed position on the camera body.

4. In a roll holding camera, the combination with a camera body, of a back hingedly attached thereto, film chambers in the camera body, a film spool winding shaft carried in one film chamber, gearing carried by the camera body and connected to said shaft, a shaft passing through the camera back and mounted to turn thereon, an operating handle on the outside of the camera back and gearing on the inside of the camera back adapted to be carried by the handle, a gear of the gearing in the camera body and back being adapted for engagement and disengagement by closing and opening the camera back by swinging said back upon its hinge.

5. In a roll holding camera, the combination with a camera body, of a back hingedly attached thereto, film chambers in the camera body, a film spool winding shaft carried in one film chamber, gearing carried by the camera body and connected to said shaft, a shaft passing through the camera back and mounted to turn thereon, an operating handle on the outside of the camera back and gearing on the inside of the camera back adapted to be carried by the handle, means for limiting the extent of movement of the handle in two directions, a pawl and ratchet included in the gearing inside the camera back, and a spring tending to hold the handle at one extent of its movement, whereby movement of the handle may turn the winding spool shaft in the camera body.

6. In a roll holding camera, the combination with a camera body having spool chambers spaced by an exposure frame, of a back adapted to cover the exposure frame and spool chambers and movably mounted on the camera body, a film spool winding shaft in one spool chamber, gearing for turning said shaft carried by the camera body, a film presser carried by the camera back, gearing carried by the camera back between the presser member and the back and adapted to mesh with said gearing on the camera body, a shaft extending through the camera back, and an oscillatable handle on said shaft for turning the film spool winding shaft through said gearing.

7. In a roll holding camera, the combination with a camera body having spool chambers spaced by an exposure frame, of a back adapted to cover the exposure frame and spool chambers and movably mounted on the camera body, a film spool winding shaft in one spool chamber, gearing for turning said shaft carried by the camera body, a film presser carried by the camera back, gearing carried by the camera back between the presser member and the back and adapted to mesh with said gearing on the camera body, stops adapted to space said film presser member from the back a distance sufficient for the gearing carried by the camera back to operate, a shaft extending through the camera back, and an oscillatable handle on said shaft for turning the film spool winding shaft through said gearing.

8. In a roll holding camera, the combination with a camera body having spool chambers spaced by an exposure frame, of a back adapted to cover the exposure frame and spool chambers and movably mounted on the camera body, a film spool winding shaft in one spool chamber, means for turning said shaft including meshing gears carried by the camera body and camera back, a shaft passing through the camera back for operating said gears, a lever outside the camera back, a handle on said lever near a lower edge of the camera back, and means to limit the movement of said handle whereby the film spool shaft may be turned by oscillating said handle.

9. In a roll holding camera, the combination with a camera body having spool chambers spaced by an exposure frame, of a back adapted to cover the exposure frame and spool chambers and movably mounted on the camera body, a film spool winding shaft in one spool chamber, gearing for turning said shaft carried by the camera body, a film presser carried by the camera back, gearing carried by the camera back between the presser member and the back and adapted to mesh with said gearing on the camera body, said gearing on the camera back including a dish shaped gear, a pawl mounted thereon, a ratchet wheel coaxially mounted with respect to said dished gear, a shaft rotatably supporting said dished gear and fixedly attached to said ratchet wheel extending through the camera back, means for limiting the rotative movement of said shaft in two directions, and means comprising a lever and handle outside of said camera back for winding the film spool shaft intermittently through the pawl and ratchet.

10. In a roll holding camera, the combination with a camera body including an exposure frame and spool chambers, of a movably mounted camera back for enclosing the spool chambers and exposure frame, a measuring roll adapted to engage a film passing between the spool chambers and to be turned as the film moves, a film spool winding shaft mounted in one film spool chamber intergeared with the measuring roll, a slip clutch between the film spool winding shaft and said gearing, a latching device for holding the measuring roll after one film area has been wound into place, a dished gear carried by the camera back and adapted to mesh with gearing connecting the film spool winding shaft and the measuring roll, and means for moving said dished gear manually comprising a pawl and ratchet wheel, a shaft passing through the camera back, stops limiting rotation of said shaft, a spring normally holding said shaft against one stop, and a handle outside the camera back adapted to be oscillated to turn the measuring roll and film winding key shaft for winding a film past the exposure aperture.

11. In a roll holding camera, the combination with a camera body including an exposure frame and spool chambers, of a movably mounted camera back for enclosing the spool chambers and exposure frame, a measuring roll adapted to engage a film passing between the spool chambers and to be turned as the film moves, a film spool winding shaft mounted in one film spool chamber intergeared with the measuring roll, a slip clutch between the film spool winding shaft and said gearing, a latching device, for holding the measuring roll after one film area has been wound into place, a dished gear carried by the camera back and adapted to mesh with gearing connecting the film spool winding shaft and the measuring roll, and means for moving said dished gear manually comprising a pawl and ratchet wheel, a shaft passing through and fastened to said ratchet wheel, said pawl being pivotally mounted on said dished gear and spring pressed into engagement with said ratchet wheel, and a handle on the shaft outside the camera back for turning the measuring roll until stopped by said measuring roll latch.

JOSEPH MIHALYI.